Jan. 6, 1970  K. A. L. STIGMARK  3,488,578

ELECTROMAGNETIC TRANSMITTERS FOR POSITIONAL INDICATION

Filed Feb. 20, 1968

3,488,578
ELECTROMAGNETIC TRANSMITTERS FOR POSITIONAL INDICATION

Karl Adolf Lennart Stigmark, Staffanstorp, Sweden, assignor to Kockums mekaniska verkstads Aktiebolag, Malmo, Sweden.
Filed Feb. 20, 1968, Ser. No. 706,895
Claims priority, application Sweden, Feb. 20, 1967, 2,285/67
Int. Cl. G01r 33/02
U.S. Cl. 324—34     2 Claims

ABSTRACT OF THE DISCLOSURE

A device for indicating the relative position between two mutually movable means one of which is a core consisting of alternately magnetically conductive and magnetically non-conductive material and extending through two coaxially disposed, spaced apart periodical differential transformers constituting the other of said means, whereby a signal from one of said transformers is phase shifted in relation to a signal from the other transformer.

---

This invention relates to inductive transmitters and more particularly to electromagnetic transmitters for positional indication.

An elegant construction for measuring large positional changes with great exactitude is the periodic differential transformer which comprises a coil including a primary winding and two secondary windings, and a core which is movable in the coil and which includes portions of magnetically conductive material alternating with portions of magnetically non-conductive material. The primary winding of such a differential transformer is supplied with alternating current of suitable frequency and voltage, and the two secondary windings are interconnected in such a way that the voltages inductively generated therein are phase shifted 180° in relation to each other. When the core travels within the transformer one obtains after a phase responsive detector an output voltage that varies sinusoidally with said travel of the core.

The invention has been developed with a view to facilitating the utilization of the output voltage obtained from the differential transformer for visual positional indication in such a way that upon travel of the core through the coil the errors that possibly arise by reason of inexactitudes in the core or coils are not added during continuous travel of the core over long distances.

The invention provides an electromagnetic transmitter for positional indication, which is characterized by the combination of two periodic differential transformers of the type indicated above, which are coaxially disposed and through which extends a core common to them and consisting of alternately magnetically conductive and magnetically nonconductive material, said two differential transformers being relatively offset axially for obtaining a 90° phase shift between the signals derived from said transformers. These signals can be combined for generation of a rotating field which is caused by prior art means to actuate an indicator for visual indication.

For better elucidation the invention will be described in the following in an embodiment, chosen by way of example, in the accompanying drawing in which.

Figure 1:
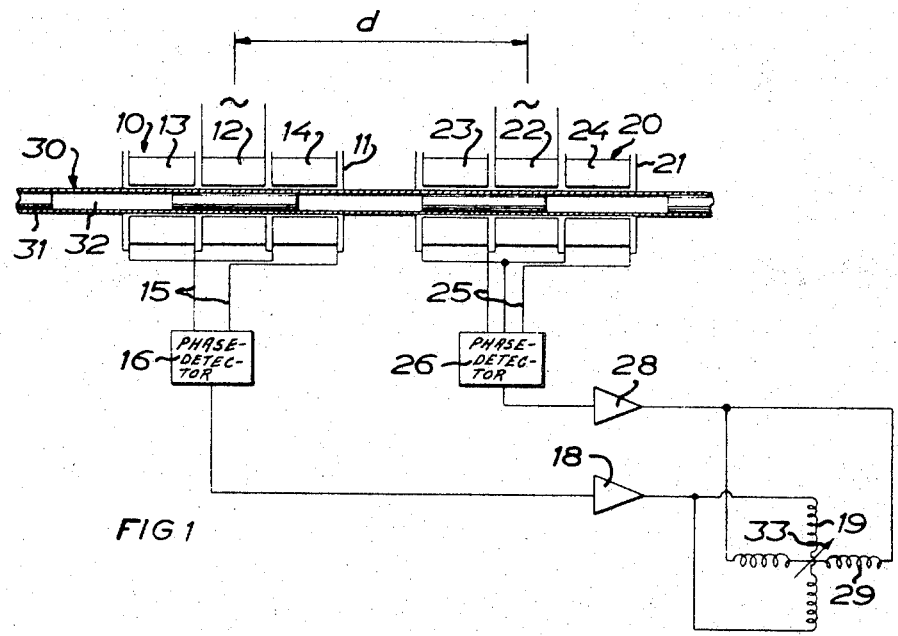
FIGURE 1 shows an electromagnetic transmitter with an indicator connected thereto.

The electromagnetic transmitter illustrated in FIGURE 1 comprises two differential transformers 10 and 20 of a previously known design. Each differential transformer includes a coil 11 and 21, respectively, having three windings, viz, a primary winding 12 and 22, respectively, to which is applied alternating current of suitable voltage and frequency from one and the same source of current, and two secondary windings 13, 14 and 23, 24, respectively, arranged on either side of said primary winding and series-connected such that the secondary voltages generated by induction are relatively phase shifted 180°. The differential transformers deliver their output voltage at a signal output 15 and 25, respectively, and these outputs are connected each to one phase-responsive detector 16 and 26, respectively.

The two differential transformers 10 and 20 are coaxial with one another and axially spaced apart a distance $d$. A core 30 common to the two transformers extends through them and alternately consists of portions 31 of magnetically conductive material and portions 32 of magnetically non-conductive material. This core may be a magnetically non-conductive pipe in which are placed bodies of magnetic material forming said portions 31 and being axially spaced apart by the empty portions 32. Upon axial travel of the core 30 through the two differential transformers the signals taken from the secondary windings thereof at outputs 15 and 25 and obtained after detection in the phase-responsive detectors 16 and 26, will vary sinusoidally. According to the invention, the distance $d$ between the two differential transformers is so dimensioned that the two output signals are relatively phase shifted 90° or (90°+2n 180°) wherein $n=1, 2, 3 \ldots$ (for practical reasons $n$ perhaps must be $\neq 0$, to avoid a coupling between the two differential transformers).

Figure 2:
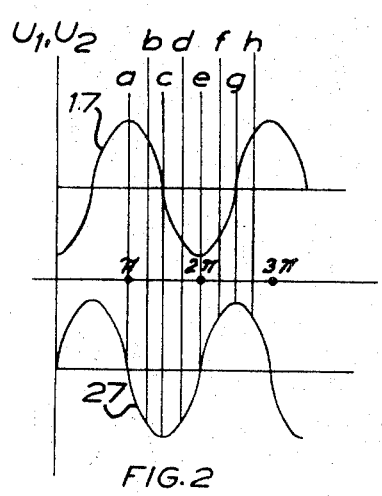
FIGURE 2 shows a diagram illustrating the signal courses derived from the two differential transformers after phase-responsive detectors.

The output signals from the detectors 16 and 26 are illustrated in FIGURE 2 wherein the upper sinus curve 17 represents the signal from the detector 16 and the lower sinus curve represents the signal from the detector 26 upon travel of the core 30 in one direction. Curve 27 lies 90° ahead of curve 17. These two curves will now be studied more in detail.

Assuming that the voltage from detector 16 has the momentary value $U_1$ and the voltage from detector 26 has the momentary value $U_2$, these momentary values can be expressed as $$U_1 = \hat{U} \sin \alpha$$
$$U_2 = \hat{U} \sin\left(\alpha + \frac{\pi}{2}\right) = U \cos \alpha$$

wherein $\alpha$ varies between 0 and $2\pi$ for a periodic travel of the core 30, and U is the output voltage peak value which is assumed to be the same for both differential transformers inasmuch as these are presumed to be identical and supplied with one and the same alternating current via primary winding 12 and 22, respectively. The output voltages $U_1$ and $U_2$ are each amplified in a D.C. amplifier 18 and 28, respectively, and each applied to one of a pair of identical magnet windings 19 and 29 which are disposed in cross phase and in which they give rise to magnet fluxes which can be defined as $$\phi_1 = k \cdot U_1$$
$$\phi_2 = k \cdot U_2$$

wherein $k$ is a constant dependent upon the amplifier and the magnet winding design. Using the above terms for voltages $U_1$ and $U_2$, one now obtains $$\phi_1 = k \cdot U \sin \alpha$$
$$\phi_2 = k \cdot U \cos \alpha$$

Figure 3:
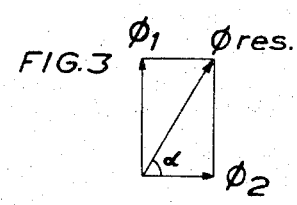
FIGURES 3 and 4 are vector diagrams illustrating the rotating field obtained from the transmitter.

These two magnet fluxes combine to a resulting magnet flux $\phi_{res}$, as is shown in FIGURE 3, and the following terms apply to the vector diagram shown therein:

$$\phi_1 = \phi_{res} \cdot \sin \alpha$$

$$\phi_2 = \phi_{res} \cdot \cos \alpha$$

Figure 4:
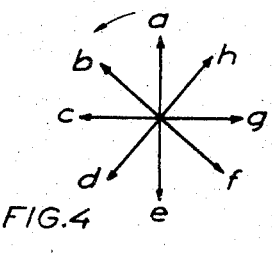

Drawing the vector diagram shown in FIGURE 3 for a number of different points $a$–$h$ of the curves 17 and 27, one obtains a vector $\phi_{res}$ having at the different points the directions illustrated in FIGURE 4. Upon travel of the core 30 in the assumed direction, vector $\phi_{res}$ thus rotates counter-clockwise, and this rotating magnet flux can in a known manner be caused to actuate a magnet, say a pole wheel, which is connected directly or by the intermediary of a transmission to a pointer 33 which can directly indicate on a scale the position of the core 30 and that of the movable means connected thereto. Upon travel of the core 30 in the opposite sense the direction of rotation of the pointer will be the opposite one. Errors, if any, in the positional indication obtained, e.g. by reason of the two differential transformers not being exactly alike, are restricted to each quadrant since the cross phase positions are entirely definite. Therefor, no addition of occurring errors can take place, and the indication will thus be equally exact irrespective of the size of the distances over which indication shall take place.

The electric system connected to the differential transformers can of course be varied within the scope of the invention and is not limited precisely to the embodiment described and shown herein. The magnet flux obtained may serve for instance to actuate controlling or adjusting means, instead of a pointer, for controlling a continuity responsive to the movement of the core 30. The important feature of the invention is that there are generated two output signals which are relatively phase shifted 90° and which permit an exact indication of the position of the core extending through the differential transformers.

What I claim and desire to secure by Letters Patent is:

1. Electromagnetic transmitter for indicating the relative position between two mutually movable means one of which includes two periodic differential transformers disposed coaxially with each other and the other comprises a common core consisting of zones of alternately magnetically conductive and magnetically non-conductive material and extending through said transformers, said zones of magnetically conductive material being spaced apart at fixed distances, these transformers being axially spaced apart a fixed distance for producing a 90° phase shift between a signal from one of said transformers and a signal from the other.

2. Electromagnetic transmitter as claimed in claim 1, wherein each of said transformers is connected by a phase-responsive detector to a magnetic winding, said windings are cross-phased to each other and produce a rotating magnetic field in accordance to travelling of said core.

References Cited

UNITED STATES PATENTS

| | | | |
|---|---|---|---|
| 2,562,329 | 7/1951 | O'Brien | 324—90 XR |
| 3,183,496 | 5/1965 | Goldstein | 340—199 XR |

OTHER REFERENCES

Rev. Sci. Inst., article by Darold Wobschall, vol. 32, No. 1; January 1961, pp. 71–73.

ALFRED E. SMITH, Primary Examiner

U.S. Cl. X.R.

340—199, 282